United States Patent
Fourcans et al.

(10) Patent No.: US 11,820,688 B2
(45) Date of Patent: Nov. 21, 2023

(54) WATER TREATMENT METHOD FOR SIMULTANEOUS ABATEMENT OF CARBON, NITROGEN AND PHOSPHORUS, IMPLEMENTED IN A SEQUENCING BATCH MOVING BED BIOFILM REACTOR

(71) Applicant: Veolia Water Solutions & Technologies Support, Saint-Maurice (FR)

(72) Inventors: Aude Fourcans, Villepieux (FR); Philippe Zozor, Verneuil sur Seine (FR); Tristan Germain, Castelginest (FR); Hugues Humbert, Claye Souilly (FR); Romain Lemaire, Vernou sur Brennes (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 233 days.

(21) Appl. No.: 17/299,824

(22) PCT Filed: Dec. 2, 2019

(86) PCT No.: PCT/EP2019/083345
§ 371 (c)(1),
(2) Date: Jun. 4, 2021

(87) PCT Pub. No.: WO2020/114979
PCT Pub. Date: Jun. 11, 2020

(65) Prior Publication Data
US 2022/0017392 A1    Jan. 20, 2022

(30) Foreign Application Priority Data
Dec. 6, 2018  (FR) .................................. 1872437

(51) Int. Cl.
*C02F 3/30* (2023.01)
*C02F 3/08* (2023.01)
(Continued)

(52) U.S. Cl.
CPC .............. *C02F 3/301* (2013.01); *C02F 3/085* (2013.01); *C02F 3/307* (2013.01); *C02F 3/308* (2013.01);
(Continued)

(58) Field of Classification Search
CPC .......... C02F 3/301; C02F 3/085; C02F 3/307; C02F 3/308; C02F 2101/105;
(Continued)

(56) References Cited

U.S. PATENT DOCUMENTS

| 8,864,993 B2 | 10/2014 | Zhao et al. |
| 2015/0321937 A1 | 11/2015 | Zhao et al. |
| 2020/0095146 A1 | 3/2020 | Lemaire et al. |

FOREIGN PATENT DOCUMENTS

| CN | 105540844 A | 5/2016 |
| CN | 105692900 A | 6/2016 |

(Continued)

OTHER PUBLICATIONS

Machine-generated English translation of WO 2018/219718, generated on Mar. 21, 2023.*
(Continued)

*Primary Examiner* — Fred Prince
(74) *Attorney, Agent, or Firm* — COATS & BENNETT, PLLC

(57) ABSTRACT

Water treatment method for simultaneous abatement of carbon, nitrogen and phosphorus, implemented in a sequencing batch moving bed biofilm reactor (SBMBBR) comprising carriers suitable for the development of a biofilm. The method comprises sequences of successive treatments, each treatment sequence comprising:

(Continued)

an initial phase of anaerobic treatment, said initial phase of anaerobic treatment being followed by at least one aerobic/anoxic cycle consisting of: —an aerobic treatment phase so as to obtain an ammonium ion concentration that does not pass below a threshold concentration of ammonium ions; and a phase in which the biofilm is placed, at least locally, under anoxic conditions, this phase being concomitant with or posterior to said aerobic treatment phase;

the threshold concentration of ammonium ions being calculated to allow the development of Anammox microorganisms during the phase in which the biofilm is placed, at least locally, under anoxic conditions.

17 Claims, 3 Drawing Sheets

(51) Int. Cl.
   *C02F 101/10* (2006.01)
   *C02F 101/16* (2006.01)

(52) U.S. Cl.
   CPC .... *C02F 2101/105* (2013.01); *C02F 2101/16* (2013.01); *C02F 2209/14* (2013.01); *C02F 2209/44* (2013.01); *Y02W 10/10* (2015.05)

(58) Field of Classification Search
   CPC .............. C02F 2101/16; C02F 2209/14; C02F 2209/44; Y02W 10/10
   USPC ....... 210/605, 614, 615, 616, 617, 903, 906, 210/908
   See application file for complete search history.

(56) References Cited

FOREIGN PATENT DOCUMENTS

| CN | 107010727 A | 8/2017 |
| EP | 1542932 B1 | 12/2008 |
| EP | 2836469 | 4/2018 |
| WO | 2013151836 A1 | 10/2013 |
| WO | 2018219718 A1 | 12/2018 |
| WO | WO 2018/219718 | * 12/2018 |

OTHER PUBLICATIONS

Helness, Herman, "Biological phosphorus removal in a moving bed biofilm reactor", Norwegian University of Science and Technology, pp. 85-96, Figure 37 (Sep. 2007).

Pastorelli, Giuseppe, et al., "Phosphorus and Nitrogen Removal in Moving-Bed Sequencing Batch Biofilm Reactors", Wat. Sci. Tech. vol. 24, No. 4-5, pp. 169-176 (1999).

Yang, Shuai, et al., Simultaneous nitrogen and phosphorus removal by a novel sequencing batch moving bed membrane bioreactor for wastewater treatment, Journal of Hazardous Materials, vol. 175, pp. 551-557 (2010).

Shuai, Y., "Research on Nitrogen and Phosphorus Removal Performance of Sequencing Batch Moving Bed Film Bioreactor", Chinese Doctoral Dissertations & Master's Theses Full-text Database (Doctor), Engineering Science and Technology I, Aug. 16, 2010, pp. 1-14.

Wang, N., et al., "Research Progress on Biological Denitrification Technology of Simultaneous Nitrification and Denitrification in MBBR", Journal of Hubei University for Nationalities, Mar. 3, 2011, pp. 8-12, vol. 29, No. 1.

Yang, S., et al., "Simultaneous nitrogen and phosphorus removal by a novel sequencing batch moving bed membrane bioreactor for wastewater treatment", Journal of Hazardous Materials 175 (2010), Oct. 20, 2009, pp. 551-557.

* cited by examiner

[Fig 1]
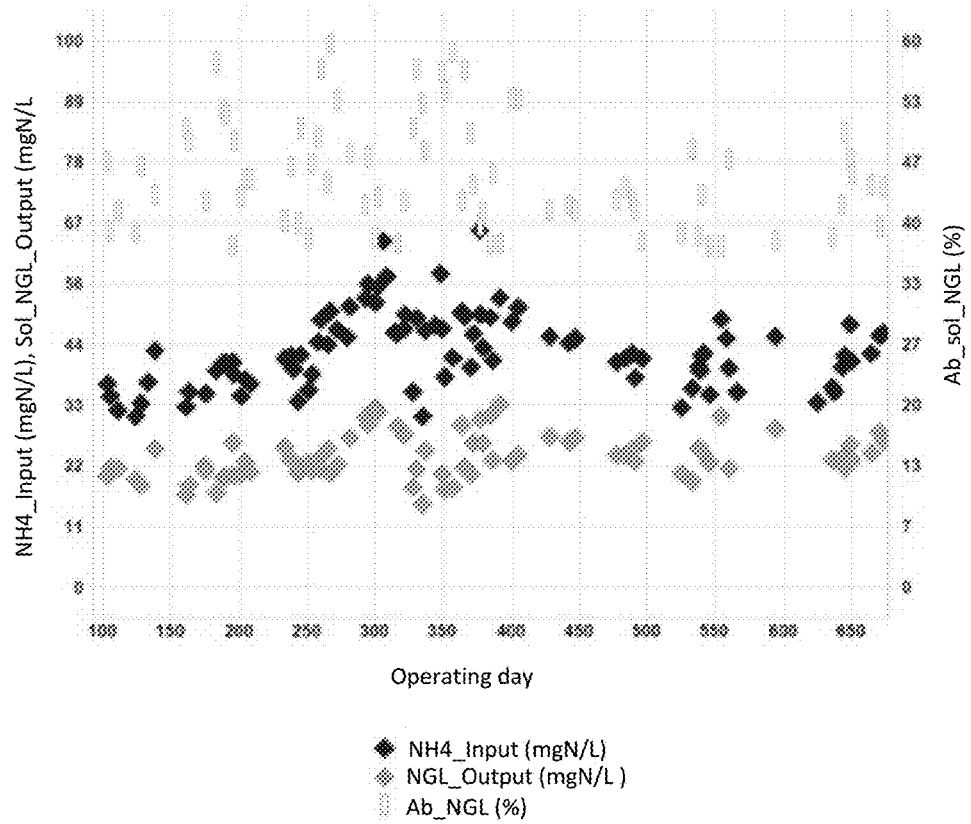
[Fig 2]
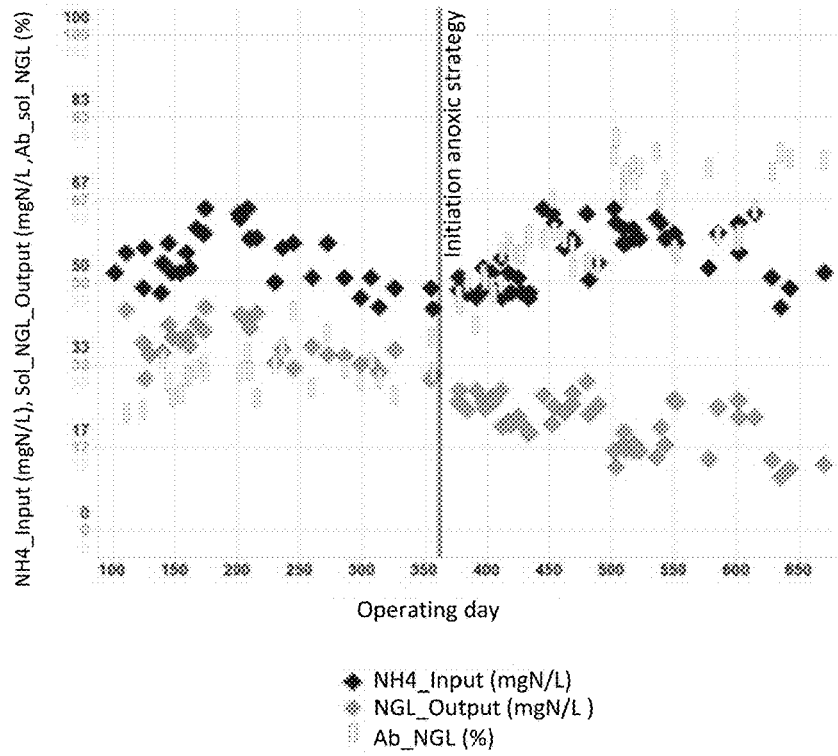

[Fig 3]
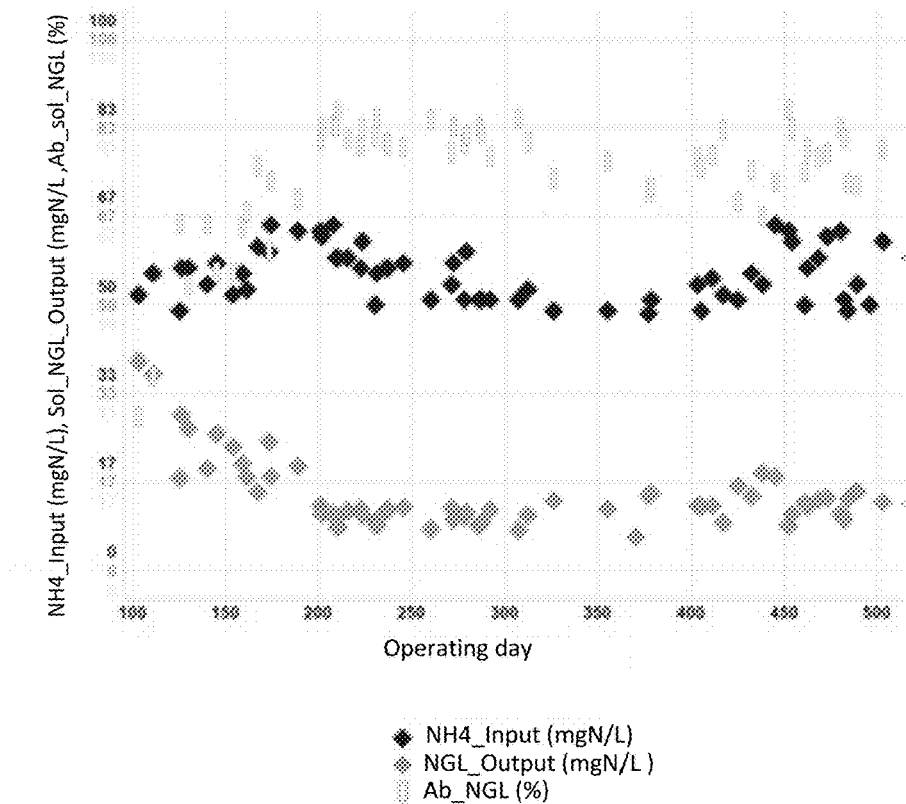
[Fig 4]
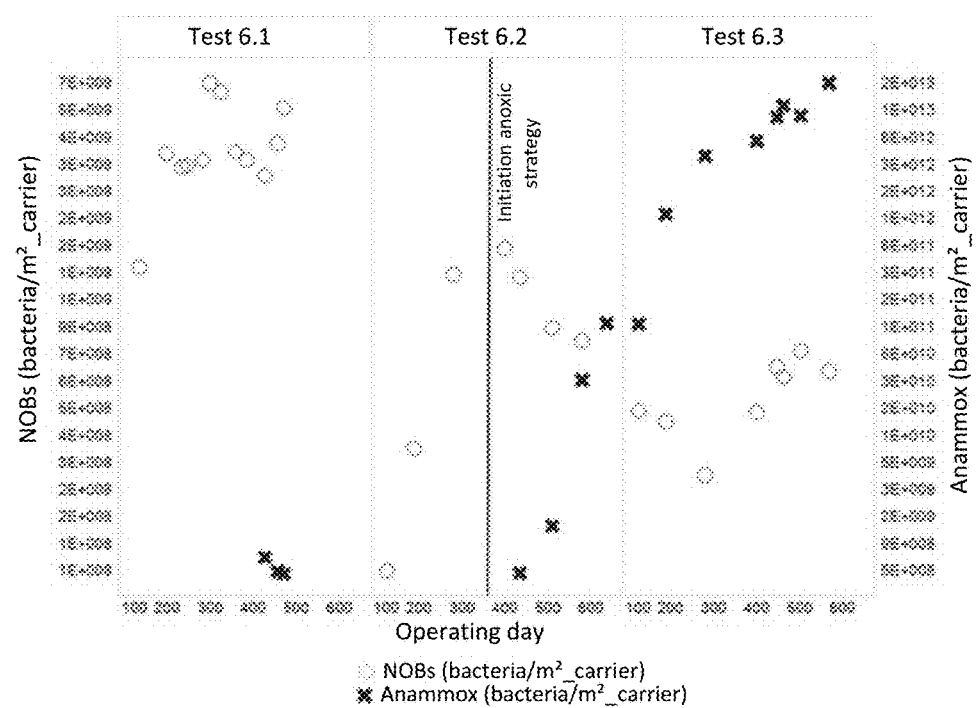

[Fig 5]
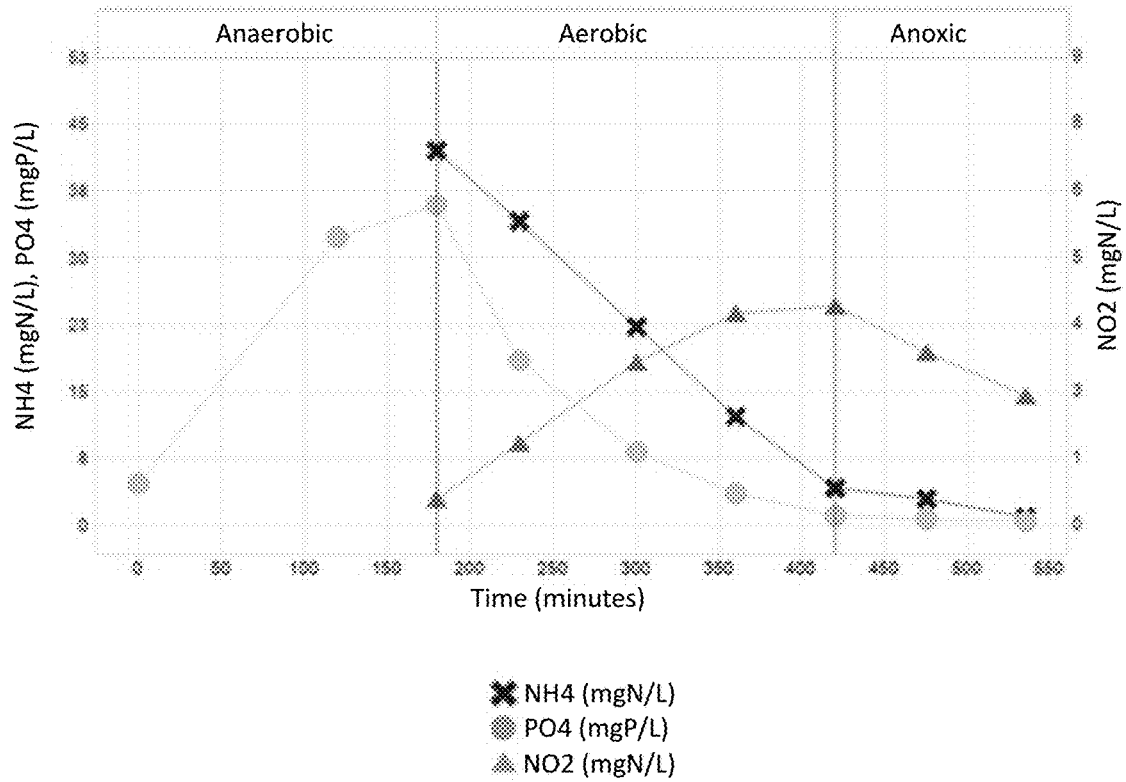
[Fig 6]
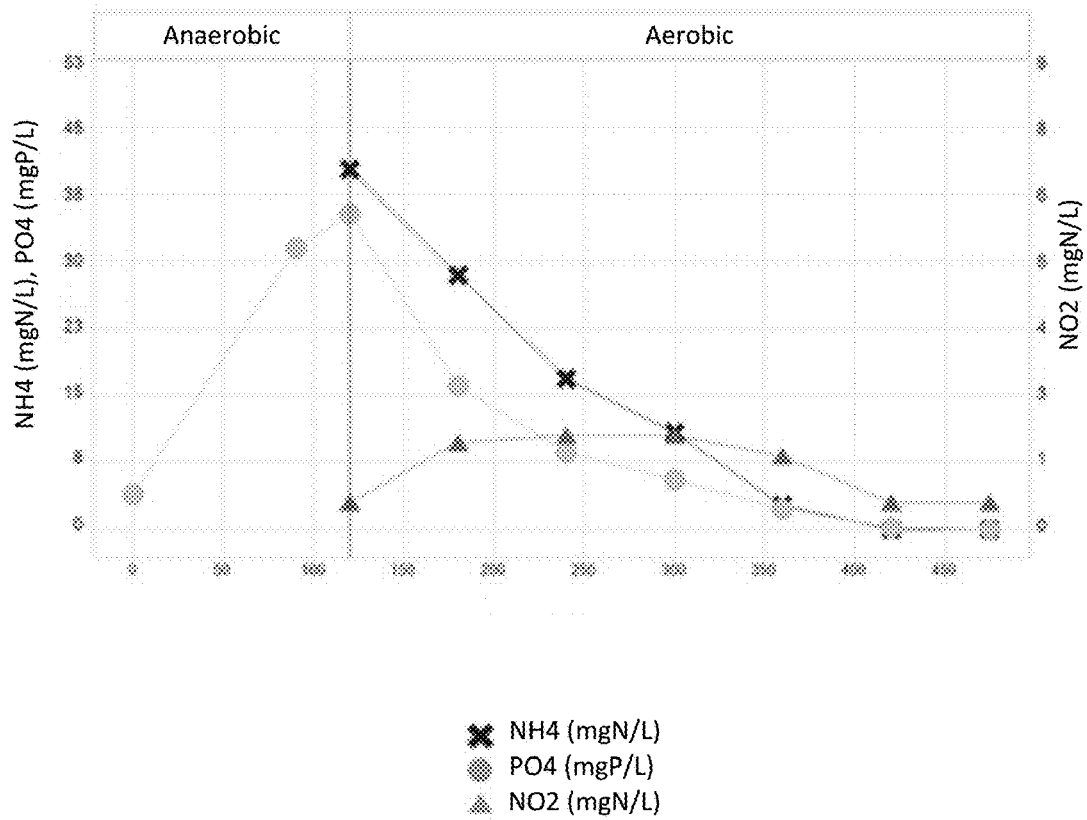

WATER TREATMENT METHOD FOR SIMULTANEOUS ABATEMENT OF CARBON, NITROGEN AND PHOSPHORUS, IMPLEMENTED IN A SEQUENCING BATCH MOVING BED BIOFILM REACTOR

FIELD OF THE INVENTION

The invention relates to the field of water treatment, in particular wastewater for purification.

More precisely, the invention relates to a biological method for simultaneous treatment of carbon, nitrogen and phosphorus in water.

PRIOR ART AND ITS DISADVANTAGES

A method for the treatment of wastewater in a conventional free biomass sequencing batch reactor (especially with activated sludge) is known from the prior art. The term "sequencing batch reactor" is also known in the state of the art by the acronym SBR. This method is now widely used throughout the world and is particularly popular because it can be implemented with a single biological basin without the need for a downstream clarifier structure, unlike a conventional method with activated sludge that, due to the continuous water supply, requires the provision of a clarifier structure downstream of the biological basin and the recirculation of the sludge to the biological basin. Thus, a facility implementing a conventional free biomass SBR method has a smaller footprint than a facility implementing a conventional activated sludge method. Depending on the quantity of wastewater to be treated, several of these biological basins can possibly be arranged in parallel.

A cycle of the biological water treatment method in a conventional free biomass SBR reactor consists successively of the following steps:
- filling the reactor with water to be treated;
- biological treatment in the reactor, consisting of alternating anaerobic, anoxic and aerobic conditions, with or without aeration;
- decantation or settling of the free biomass and the suspended matters; and
- clarification/draining of treated water.

The biological treatment under aerobic conditions allows the degradation of carbon and the transformation of ammonium ($NH_4^+$) into nitrite ions ($NO_2^-$) and then into nitrate ions ($NO_3^-$) (nitrification) thanks to a specific nitrifying biomass. The biological treatment under anoxic conditions allows the removal of nitrate ions ($NO_3^-$) in dinitrogen gas ($N_2$) (denitrification) thanks to a denitrifying heterotrophic biomass. If necessary, the phosphorus can be removed either by biological means or by physical-chemical means by adding metal salts, such as iron or aluminium salts. The removal of phosphorus by biological means requires a phase with anaerobic conditions, during which the relevant biomass salts out phosphorus and consumes exogenous carbon to build up internal reserves, and a phase with aerobic and/or anoxic conditions, during which the same biomass overaccumulates a large part of the phosphorus present in the reaction medium thanks to its internal carbon reserves that provide to it the required energy source.

Variants of the above method for optimising the treatment performance are achieved by compartmentalising the activated sludge SBR reactor. This is referred to as a treatment method in a compartmentalised free biomass SBR reactor. For example, when an advanced denitrification of the effluent is required, a compartment used under anoxic conditions and with stirring can be added at the head of the free biomass SBR reactor. This configuration requires a sequential recirculation of the mixed liquor (free biomass and effluent) using a pump between the head compartment used under anoxic conditions and the other compartment. The recirculation must be stopped in particular during the settling and draining phases of the compartmentalised free biomass SBR reactor. The compartment used under anoxic conditions allows to achieve a more efficient biological denitrification of the water to be treated. Indeed, the water to be treated introduced into the head compartment is loaded with COD (Chemical Oxygen Demand), i.e. constitutes a rich source of carbon, which makes it possible to maintain a high denitrifying bacteria concentration. As another example, when biological phosphorus removal is required, a two-compartment free biomass SBR reactor can be used with a first compartment under anaerobic conditions and a second compartment under alternating anoxic and aerobic conditions, or a three-compartment free biomass SBR reactor can be used with a first compartment under anaerobic conditions, a second compartment under anoxic conditions and a third compartment under aerobic conditions. This configuration also requires a sequential recirculation of the mixed liquor (free biomass and effluent) using a pump between the head compartment used under anaerobic conditions and the other compartment(s). Similarly, the recirculation must be stopped in particular during the decantation (settling) and draining phases of the SBR reactor.

However, biological water treatment methods in a conventional or compartmentalised free biomass SBR reactor have several disadvantages. A first disadvantage is that due to the low settling speed of the suspended matters (mainly constituted of the purifying free biomass), these methods require the implementation of large volume reactors. A second disadvantage of these free biomass SBR methods is that they have limited treatment performance, in particular limited performance for nitrification. Indeed, the activated sludge concentration in the SBR reactor is often limited, in practice strictly less than 5 g/L, in order not to alter the clarification step. A third disadvantage of these conventional SBR methods is that it is necessary to maintain a high sludge age in the SBR reactor, in practice a sludge age of strictly more than 15 days at 12° C., in order to achieve a sufficient level of nitrification. This implies a significant increase in the size of the water treatment facilities.

A biological treatment method in a moving bed biofilm reactor (MBBR) operated in SBR mode, otherwise known as a sequencing batch moving bed biofilm reactor, is also known in the prior art. This type of reactor is also known by the acronym SBMBBR. It avoids the problems associated with the use of a free biomass with a slow settling speed. This method with culture on media combines the advantages of the MBBR method (resistance to load variations, absence of bulking, physical and biological heterogeneity of the biomass, preservation of the biomass on the carriers) with the interest of the temporal phasing of biological reactions of the cycle of an SBR reactor by the alternation of anaerobic/aerobic/anoxic phases. It can be used for the treatment of phosphorus in particular. The absence of free biomass in the reactor enables the total or almost total draining of the liquid contained in the reactor at the end of the SBR cycle, without a prior settling step, unlike the SBR reactors with free biomass or biomass consisting of granules. The reactor is equipped with perforated grids that retain the media in the biological basin while allowing the purified water and suspended matter to pass through during the draining phases. This feature allows for a very compact SBMBBR reactor. However, the drained treated water contains suspended matters, in the order of 100 to 500 mg/L, from the water to be treated and from the detachment of the surface parts of the biofilm. The water treated in an SBMBBR reactor generally requires a downstream step for separating these suspended matters through a settling tank, a flotation device or a filter. The structure used for this separation step can be particularly compact due to the low SM (suspended matters) concentrations.

Some tests were carried out in an SBMBBR reactor on synthetic or semi-synthetic municipal wastewater, implementing anaerobic/aerobic cycles without limitation of the dissolved oxygen, i.e. with an uncontrolled aeration and therefore very high dioxygen concentrations, with KMT and also K1 carriers (see HELNESS H., "*Biological phosphorus removal in a moving bed biofilm reactor*", Trondheim, Norwegian University of Science and Technology, 2007, pages 85-96; FIG. 37). Helness' results show promising results for the treatment of carbon, nitrogen and phosphorus in the tested water. However, the tests were carried out on municipal water with a low $NH_4$ and $PO_4$ concentration, doped with acetate (favourable for the biological treatment of phosphorus because it is an organic carbon that can be easily used by the dephosphating bacteria) and with a COD:TKN (Chemical Oxygen Demand:Total Kjeldhal Nitrogen) ratio that is advantageous for the treatment of nitrogen (COD:TKN ratio greater than or equal to 10). Furthermore, the results of concentration profiles during a treatment cycle show a delay between the biological uptake of phosphorus and the nitrification. Indeed, the limiting step is the nitrification, that requires aeration to be continued for 75 minutes while phosphorus ($PO_4$) is already consumed. The inventors of the present invention have repeated these tests on an SBMBBR reactor treating real municipal water, more concentrated in nitrogen than the one tested by Helness, without any exogenous supply of organic matter and with a COD:TKN comprised between 5 and 8 (and therefore less favourable for the overall nitrogen treatment). Then, they could confirm this delay between the time required to over-accumulate phosphorus and to complete nitrification during the aeration step of the SBMBBR reactor.

Thus, the biological treatment methods for carbon, nitrogen and phosphorus in water in a sequencing batch moving bed biofilm reactor known in the prior art have the disadvantage of having a particularly long aeration step, that leads to an overconsumption of dioxygen and therefore an overconsumption of energy in the corresponding facility, and that also leads to a lengthening of the water treatment cycle and therefore to a necessary oversizing of the corresponding facility.

Furthermore, municipal wastewater often contains quantities of biodegradable soluble COD that can be limiting to achieve both anoxic denitrification and biological phosphorus removal. It is therefore often necessary to add either an external source of carbon to enhance denitrification or metal salts to achieve phosphorus precipitation. Thus, the methods of the prior art are not fully suitable for the efficient biological removal of nitrogen from certain water to be treated, in particular for water having a too high nitrogen load or a too low C/TKN ratio.

PURPOSES OF THE INVENTION

The purpose of the present invention is to overcome at least some of the disadvantages of the mentioned prior art.

One purpose of the invention is to propose an improved method for simultaneous biological treatment of carbon, nitrogen and phosphorus that is simple, flexible, stable and robust and that can be implemented in a particularly compact facility.

Another purpose of the invention is to propose a method that improves the performance of biological removal of total nitrogen and phosphorus while reducing the organic carbon requirements of the biomass.

SUMMARY OF THE INVENTION

The invention relates to a method for simultaneous treatment of carbon, nitrogen and phosphorus in water, in a sequencing batch moving bed biofilm reactor (SBMBBR), comprising carriers suitable for the development of a biofilm.

The method comprises sequences of successive treatments, each treatment sequence comprising: —an initial phase of anaerobic treatment,
said initial phase of anaerobic treatment being followed by at least one aerobic/anoxic cycle consisting of: —an aerobic treatment phase so as to obtain an ammonium ion concentration that does not pass below a threshold concentration of ammonium ions; and
a phase in which the biofilm is placed, at least locally, under anoxic conditions, this phase being concomitant with or posterior to said aerobic treatment phase;
the threshold concentration of ammonium ions being calculated to allow the development of Anammox microorganisms during the phase in which the biofilm is placed, at least locally, under anoxic conditions.

"Aerobic" refers to the presence of dioxygen in a reaction medium. The dissolved dioxygen concentration is then generally greater than or equal to 0.5 mg $O_2$/L.

"Anaerobic" refers to the total or almost total absence of dioxygen in a reducing reaction medium, i.e. in particular not including oxidised forms of nitrogenous compounds, such as nitrate ($NO_3^-$) or nitrite ($NO_2^-$) ions for example. The dissolved dioxygen concentration is then close to 0 mg $O_2$/L.

"Anoxic" conditions refers to the total or almost total absence of dissolved dioxygen in an oxidising reaction medium, i.e. comprising oxidised forms of nitrogen compounds, such as nitrate ($NO_3^-$) or nitrite ($NO_2^-$) ions for example. The dissolved dioxygen concentration is then close to 0 mg $O_2$/L.

"Locally" anoxic conditions means that within the SBMBBR, there are local zones under anoxic conditions, whereas the SBMBBR is globally aerobic. This is particularly the case in particular embodiments where the geometry of the carriers allows them to remain in close proximity to each other when the aeration intensity is moderate, and thus to locally form anoxic zones.

"Anammox" microorganisms are microorganisms capable, under anaerobic conditions, of transforming ammonium and nitrite into dinitrogen according to the equation: $NH_4^+ + NO_2^- \rightarrow N_2 + 2\ H_2O$;

The present invention is therefore based on the implementation in an SBMBBR reactor of a biological treatment having an initial anaerobic phase followed by at least one aerobic/anoxic cycle in which the aerobic phase is implemented so as to create favourable conditions, in particular a suitable ammonium ion concentration in the biofilm, for the development of Anammox microorganisms under anoxic conditions. The Anammox microorganisms advantageously allow to remove the ammonium directly in the form of dinitrogen without going through the nitrate ($NO_3^-$) form and without the need for carbon. The method according to the invention also allows the development of denitrifying microorganisms capable of accumulating polyphosphates. They are also known as "denitrifying polyphosphate accumulative organisms" or DPAOs. They allow the removal of nitrates (denitrification) without the need for an additional source of carbon and the biological treatment of phosphorus without the need for additional metal salts.

Thus, in the method according to the invention, there is preferably no pre-seeding with Anammox or DPAO microorganisms.

Furthermore, in the method according to the invention, there is preferably no addition of an external source of carbon and/or of an external source of metal salts.

The method according to the invention can in particular be implemented with water to be treated having a relatively low COD compared to its nitrogen and phosphorus content. The method according to the invention, carried out without adding an external source of carbon and/or an external source of metal salts, can in particular treat water with COD/TKN ratios below 7, preferably below 10 (Chemical Oxygen Demand:Total Kjeldhal Nitrogen). "Total Kjeldahl Nitrogen" is the sum of ammonia nitrogen ($NH_4$) and organic nitrogen.

The biofilm grows on carriers suitable for its development. This provides many advantages compared to a free biomass. In particular, the carriers enable a higher biomass concentration to be obtained and thus the size of the corresponding facilities to be reduced. The carriers allow an increased selection of the microorganisms of interest, in this case Anammox and DPAO microorganisms. The carriers also make it easy to reach a higher sludge age than for an activated sludge method, by allowing the microorganisms to grow better. The biofilm has a better response to COD variations and a better resistance to possible toxic shocks.

With the conventional carriers used in an SBMBBR reactor, such as the "K5" carriers from Anoxkaldnes™, the phase in which the biofilm is placed under anoxic conditions is generally posterior to the aerobic treatment phase.

In some embodiments, the carriers are capable of remaining in close proximity to each other when aeration is moderate, thus forming local anoxic conditions during an aerobic treatment phase, like the "Z" carriers from Anoxkaldnes™, for example. According to these embodiments, the phase in which the biofilm is placed under anoxic conditions can be concomitant with or posterior to the aerobic treatment phase.

Each treatment sequence of the method according to the invention comprises filling the SBMBBR with water to be treated under anaerobic conditions.

The filling step of the SBMBBR can be carried out more or less quickly. In particular, the filling time can be comprised between 30 minutes and 5 hours, preferably between 90 and 180 minutes. At the end of the filling step, the SBMBBR can be more or less filled. Advantageously, the SBMBBR has a volume exchange ratio (VER) comprised between 90% and 100%. The volume exchange ratio is defined as the ratio between the volume of water discharged at the end of the cycle and the total volume of water in the SBMBBR after the supplying phase.

The initial phase of anaerobic treatment lasts from 30 minutes to 5 hours. The anaerobic initial phase notably allows the initiation of the biological phosphorus removal mechanisms thanks to the presence of DPAO microorganisms. A degradation or reduction of the soluble organic carbon of the water present in the SBMBBR reactor and an increase of inorganic phosphorus are observed, the salting-out of inorganic phosphorus by the DPAO microorganisms being an essential step for phosphorus removal. The internal carbon reserves built up during the initial anaerobic phase allow the DPAO microorganisms to accumulate polyphosphates by using nitrate ions or nitrite ions rather than dioxygen during the at least one aerobic/anoxic cycle.

In each treatment sequence of the method according to the invention, the anaerobic treatment phase is followed by at least one aerobic/anoxic cycle, preferably 1 to 5 cycles.

An aerobic/anoxic cycle comprises an aerobic treatment phase. This ensures the transformation of ammonium ($NH_4^+$) mainly into nitrite ions ($NO_2^-$) and to a lesser extent into nitrate ions ($NO_3^-$). In order for the transformation of $NH_4^+$ to stop mainly at the $NO_2^-$ species without a transformation into $NO_3^-$, low $O_2$ concentrations, a limited aeration time, "local" anoxic conditions, as well as an alternation of aerobic/anoxic phase are necessary and are levers for inhibiting NOBs ("Nitrite Oxidizing Bacteria" that transform nitrites into nitrates), thus allowing the accumulation of nitrites.

The presence of DPAOs leads to additional competition with NOBs for nitrites. Thus, the combination of Anammox and DPAOs limits the development of NOBs.

Microorganisms that can carry out this transformation are, for example, ammonia oxidizing bacteria, or AOBs, that can transform $NH_4^+$ into $NO_2^-$. At low oxygen concentrations, the apparent growth kinetics are greater for AOBs than for NOBs ("Nitrite Oxidizing Bacteria"), allowing them to accumulate and/or produce nitrites.

The aerobic treatment phase is implemented so as to obtain an ammonium ion concentration higher than a threshold concentration of ammonium ions, this threshold concentration being calculated to allow the development of Anammox microorganisms during the phase in which the biofilm is placed, at least locally, under anoxic conditions. The threshold concentration depends on the COD:TKN:P ratio of the water to be treated. Advantageously, the threshold concentration of ammonium ions is ≥1 mg N/L, preferably ≥2 mg N/L.

An aerobic/anoxic cycle also includes a phase in which the biofilm is placed, at least locally, under anoxic conditions. This phase is concomitant with or posterior to the aerobic treatment phase. During this phase, Anammox and DPAO microorganisms transform $NH_4^+$, $NO_2^-$ and $NO_3^-$ into dinitrogen without requiring an external source of carbon. DPAOs also remove phosphorus from the water by accumulation.

Advantageously, the at least one aerobic/anoxic cycle lasts from 1 hour to 10 hours.

In particular embodiments, each cycle of the at least one aerobic/anoxic treatment cycle, the phase in which the biofilm is placed under predominantly anoxic conditions is posterior to the aerobic phase.

In these embodiments, the ratio between the duration of the aerobic phase and the duration of the phase in which the biofilm is placed under predominantly anoxic conditions is advantageously comprised between 1:1 and 2:1. In other words, for a method comprising only one aerobic/anoxic cycle, the duration of the aerobic phase can notably be ½ and the duration of the phase in which the biofilm is placed under predominantly anoxic conditions can be ½ of the total duration of the aerobic/anoxic cycle. Alternatively, the duration of the aerobic phase can notably be: ⅔ and the duration of the phase in which the biofilm is placed under predominantly anoxic conditions can be ⅓ of the total duration of the aerobic/anoxic cycle. For a method comprising two aerobic/anoxic cycles, the duration of each aerobic phase can notably be: ¼ and the duration of each phase in which the biofilm is placed under predominantly anoxic conditions can be ¼ of the total duration of the aerobic/anoxic cycles. Alternatively, the duration of each aerobic phase can notably be: ⅓ and the duration of each phase in which the biofilm is placed under predominantly anoxic conditions can be ⅙ of the total duration of the aerobic/anoxic cycles.

According to a preferred embodiment of the invention, for each biological treatment cycle, the anaerobic treatment phase lasts from 1 hour to 5 hours and the at least one aerobic/anoxic cycle lasts from 1 hour to 10 hours.

LIST OF FIGURES

The invention, as well as its various advantages, will be more readily understood with the following description of two non-restrictive embodiments thereof, as well as one embodiment of a conventional method that is not part of the invention, with reference to the following figures:

FIG. 1 is a graph showing the nitrogen concentration of the ammonia ion ($NH_4^+$) at the input of the SBMBBR (left-y-axis; mg N/L), the soluble global nitrogen (soluble NGL=soluble TKS+$NO_2^-$+$NO_3^-$) concentration at the output of the SBMBBR (left-y-axis; mg N/L) and the soluble global nitrogen removal efficiency (right-y-axis; %) as a function of the operating days in a conventional SBMBBR method. The soluble global nitrogen content of the water to be treated is mainly ammonia nitrogen, the nitrite ($NO_2$) and nitrate ($NO_3^-$) content being negligible at the input of the SBMBBR.

FIG. 2 is a graph showing the nitrogen concentration of the ammonia ion ($NH_4^+$) at the input of the SBMBBR (mg N/L), the soluble global nitrogen (soluble NGL) concentration at the output of the SBMBBR (mg N/L) and the soluble global nitrogen removal efficiency (%) as a function of the operating days in a method implemented according to the invention where the application of anoxic conditions is posterior to the aerobic phase. The soluble global nitrogen content of the water to be treated is mainly ammonia nitrogen, the nitrite ($NO_2^-$) and nitrate ($NO_3^-$) content being negligible at the input of the SBMBBR.

FIG. 3 is a graph showing the nitrogen concentration of the ammonia ion ($NH_4^+$) at the input of the SBMBBR (mg N/L), the global nitrogen (soluble NGL) concentration at the output of the SBMBBR (mg N/L) and the nitrogen removal efficiency (%) as a function of the operating days in a method implemented according to the invention where the application of anoxic conditions is concomitant with the aerobic phase. The soluble global nitrogen content of the water to be treated is mainly ammonia nitrogen, the nitrite ($NO_2^-$) and nitrate ($NO_3^-$) content being negligible at the input of the SBMBBR.

FIG. 4 is a graph showing the number of NOB bacteria in the biofilm (left-y-axis; NOB bacteria/$m^2$ of biofilm carrier) and the number of Anammox bacteria in the biofilm (right-y-axis; Anammox bacteria/$m^2$ of biofilm carrier) as a function of the test days and for the three implementations of the SBMBBR (conventional implementation on the left, implementation according to the invention where the application of anoxic conditions is posterior to the aerobic phase in the middle, implementation according to the invention where the application of anoxic conditions is concomitant with the aerobic phase on the right).

FIG. 5 is a graph showing the phosphate ($PO_4$) concentration in the SBMBBR (left-y-axis; mg P/L), the nitrogen concentration of the ammonia ion ($NH_4^+$) in the SBMBBR (left-y-axis; mg N/L) and the nitrogen concentration of the nitrite ion ($NO_2^-$) in the SBMBBR (right-y-axis; mg N/L) during a single treatment cycle that took place during the implementation of the SBMBBR method according to the invention, where the application of anoxic conditions is posterior to the aerobic phase.

FIG. 6 is a graph showing the phosphate ($PO_4$) concentration in the SBMBBR (left-y-axis; mg P/L), the nitrogen concentration of the ammonia ion ($NH_4^+$) in the SBMBBR (left-y-axis; mg N/L) and the nitrogen concentration of the nitrite ion ($NO_2^-$) in the SBMBBR (right-y-axis; mg N/L) during a single treatment cycle that took place during the implementation of the SBMBBR method according to the invention, where the application of anoxic conditions is concomitant with the aerobic phase.

DESCRIPTION OF DETAILED EMBODIMENTS OF THE INVENTION

Tests were carried out according to two embodiments of the invention and compared to the results obtained by another test implementing the "conventional" method in a SBMBBR that is not part of the invention.

Test 6.1—Conventional implementation of the "SBMBBR" used for comparison purposes and not being part of the invention.

For this implementation, "conventional" carriers were used, such as "K5" carriers from Anoxkaldnes™. These carriers are perfectly fluidised when the aeration required to achieve aerobic conditions is applied.

The "conventional" SBR cycles consists of two phases: an anaerobic phase followed by an aerobic phase.

The carriers are not seeded with Anammox bacteria before the start of the tests.

Their oxygen content in the reaction medium during the aerobic phase are maintained at values comprised between 4 and 5 mg $O_2$/L.

With reference to FIG. 1, under these operating conditions, the soluble global nitrogen (soluble NGL) removal is comprised between 33 and 67%, thus reaching soluble global nitrogen concentrations in the treated water close to 25 mg N/L and always above 20 mg N/L over the 600 days of testing.

With reference to FIG. 4 (left part of the graph), the number of NOB bacteria per $m^2$ of carrier is high and in the order of $10^8$ per $m^2$ of carrier. The one of Anammox bacteria remains low, in the order of $10^8$ per $m^2$ of carrier corresponding to the quantification limit of the analytical method.

Test 6.2—Implementation of a method according to the invention with the introduction of an anoxic phase posterior to the aerobic phase.

For this implementation, "conventional" carriers were used, such as "K5" carriers from Anoxkaldnes™. These carriers are perfectly fluidised when the aeration required to achieve aerobic conditions is applied.

The carriers were not seeded with Anammox bacteria before the start of the tests.

Until day 350, the SBMBBR operates in a conventional manner, with treatment cycles alternating between a 2-hour anaerobic phase and a 6-hour aerobic phase. This period corresponds to a seeding of the biofilm with dephosphating and nitrifying bacteria.

From day 350, an anoxic phase is added after the aerobic phase. Typically, the duration of the different operating phases is 2 to 3 hours for the anaerobic phase, 4 to 5 hours for the aerobic phase, and 1 to 2 hours for the anoxic phase. The aeration conditions (duration and oxygen content) of the aerobic phase are adjusted to reach an ammonia ($NH_4^+$) content in the reaction medium greater than or equal to 1 mg N/L before the anoxic phase. The oxygen content in the reaction medium is comprised between 4 and 5 mg $O_2$/L for the aerobic phase, and 0 mg $O_2$/L for the anoxic phase.

With reference to FIG. 2, until day 350 before the implementation of the invention, the abatement of soluble global nitrogen (mg N/L) is comprised between 25 and 45% to reach a content in the treated water comprised between 30 and 45 mg N/L. After the implementation of the invention by adding an anoxic phase posterior to the aerobic phase, where the aeration conditions are adjusted to reach an ammonium ($NH_4^+$) content higher than 1 mg N/L, a progressive increase of this abatement is observed, that reaches 80% with a soluble global nitrogen content in the treated water comprised between 10 and 25 mg N/L.

With reference to FIG. 4 (middle part of the graph), the number of NOB bacteria per $m^2$ of carrier is high and in the order of $10^9$ before day 350 of operation. After seeding the biofilm with nitrifying bacteria and achieving complete nitrification, this number is in the same order of magnitude as for the conventional implementation described in paragraph 6.1. After the implementation of the anoxic phase, the number of NOBs decreases to one log less. NOB bacteria lose the competition for nitrites against Anammox bacteria and DPAOs and are gradually eliminated from the biofilm.

Before day 350 and until the implementation of the invention, the number of Anammox bacteria remains low, in the order of $10^8$ per $m^2$ of carrier corresponding to the quantification limit of the analytical method.

After implementing the invention by adding an anoxic phase posterior to the aerobic phase, where the aeration conditions are adjusted to reach an ammonium ion ($NH_4^+$) content of more than 1 mg N/L, the number of Anammox bacteria increases progressively to reach $10^{11}$ Anammox bacteria/$m^2$ of carrier. This number of bacteria is considered high and representative of proven Anammox activity in the biofilm.

With reference to FIG. 5, the consumption of ammonium ions ($NH_4^+$) and the accumulation of nitrite ions ($NO_2^-$) during the aerobic phase are notably observed, followed by a simultaneous consumption of ammonium ions ($NH_4^+$) and nitrite ions ($NO_2^-$) during the anoxic phase. At the end of the treatment cycle by the activity of Anammox bacteria, the soluble global nitrogen content is 11 mg N/L, comprising respectively ammonium ion ($NH_4^+$) content of 1 mg N/L, nitrite ion ($NO_2^+$) content of 2 mg N/L and nitrate ion ($NO_3^-$) content of 8 mg N/L. The $PO_4$ concentration in the treated water is also less than 0.5 mg P/L, corresponding to an abatement of $PO_4$ of more than 90% for the cycle in question without the addition of chemicals.

It has therefore been shown that the embodiment with an anoxic phase posterior to the aeration phase is more effective in removing nitrogen than the conventional method. Indeed, after the implementation of the "anoxic" strategy around day 350, the nitrogen removal efficiencies (soluble NGL) increased rapidly and stabilised at 75-80% over more than 200 days (day 450 to day 650). The soluble NGL content at the output of the reactor decreased significantly to less than 15 mg N/L over the same period. Before the implementation of the "anoxic" strategy, the measurements of Anammox bacteria by qPCR did not allow the detection of Anammox bacteria (quantities below the quantification limit in the order of $5.10^8$). From the implementation of the "anoxic" strategy around day 350, the quantities increased rapidly and significantly to reach values in the order of $1.10^{11}$. The development and activity of Anammox bacteria largely explain the good nitrogen removal efficiencies.

6.3—Implementation of a method according to the invention where the creation of anoxic zones is concomitant with the aerobic phase.

For this implementation, "corrugated" carriers were used, such as "Z" carriers from Anoxkaldnes™. These carriers favour the creation of local anoxic zones during the aeration phases.

The implemented operation consists of a 2-hour anaerobic phase followed by a 6-hour aerobic phase. The dissolved oxygen content during the aerobic phase is comprised between 4 and 5 mg $O_2$/L.

The "Z" carriers used, due to their geometry, can remain in close proximity to each other, thus forming local anoxic conditions during the aerobic treatment phase.

With reference to FIG. 3, the implementation of the invention comprising an anaerobic phase followed by an aerobic phase during which the ammonium ion concentration is greater than 1 mg N/L and for which the biofilm is placed under anoxic conditions locally, an abatement of soluble global nitrogen NGL comprised between 70 and 90% is observed, to reach on average a content in the treated water in the order of 10 mg N/L.

With reference to FIG. 4 (right part of the graph), the mean number of NOB bacteria per $m^2$ of carrier is in the order of $10^8$ for the entire duration of the tests. Furthermore, the average number of Anammox bacteria per $m^2$ of carrier is in the order of $10^{13}$, which is a very high number for a method whose treatment objectives do not exclusively concern the abatement of global nitrogen by Anammox bacteria.

With reference to FIG. 6, despite a dissolved oxygen concentration of 5 mg $O_2$/L in the liquid throughout the aerobic phase, the soluble global nitrogen (NGL) concentration in the treated water reached 10 mg N/L comprising respectively an ammonium ion ($NH_4^+$) concentration of 0.1 mg N/L, a nitrite ion ($NO_2$) concentration of 0.9 mg N/L and a nitrite ion ($NO_3^-$) concentration of 9 mg N/L. The $PO_4$ concentration in the treated water is also equal to 0.1 mg P/L, corresponding to an abatement of $PO_4$ of more than 95% for the cycle in question without the addition of chemicals.

With reference to FIG. 3, it has been shown that by establishing local "anoxic" conditions concomitant with the aerobic phase, the development of species such as Anammox bacteria and the performance of nitrogen treatment are greatly improved while ensuring a satisfactory carbon and phosphorus removal. The soluble global nitrogen (SGN) content at the output of the reactor fluctuated between 10 and 15 mg N/L with a number of Anammox bacteria in the biofilm in the order of $10^{12}$-$10^{13}$/$m^2$ of carrier.

The invention claimed is:

1. Water treatment method for simultaneous abatement of carbon, nitrogen and phosphorus, implemented in a sequencing batch moving bed biofilm reactor (SBMBBR) comprising carriers suitable for development of a biofilm, said method comprising sequences of successive treatments, each treatment sequence comprising:
    an initial phase of anaerobic treatment,
    said initial phase of anaerobic treatment being followed by at least one aerobic/anoxic cycle comprising:
    an aerobic treatment phase so as to obtain an ammonium ion concentration that does not pass below a threshold concentration of ammonium ions; and
    a phase in which the biofilm is placed, at least locally, under anoxic conditions, this phase being concomitant with or posterior to said aerobic treatment phase;
    the threshold concentration of ammonium ions being calculated to allow development of anammox microorganisms during the phase in which the biofilm is placed, at least locally, under anoxic conditions.

2. Method according to claim 1, wherein the threshold concentration of ammonium ions is ≥1 mg N/L.

3. Method according to claim 1 wherein, for each treatment sequence the SBMBBR has a volume exchange ratio (ERV) between 90% and 100%.

4. Method according to claim 1, wherein for each biological treatment cycle, the anaerobic treatment phase lasts from 30 minutes to 5 hours and the at least one aerobic/anoxic cycle lasts from 1 hour to 10 hours.

5. Method according to claim 1, wherein for each cycle of the at least one aerobic/anoxic treatment cycle, the phase in which the biofilm is placed under anoxic conditions is posterior to the aerobic phase, and the ratio between the duration of the aerobic phase and the total duration of the aerobic-anoxic phase is between 0.2 and 0.8.

6. Method according to claim 1, wherein said carriers are capable due to their geometry to remain in proximity to each other when aeration intensity is moderate, thus forming local anoxic conditions during an aerobic treatment phase.

7. Method according to claim 1, wherein there is no pre-seeding with anammox microorganisms and denitrifying polyphosphate accumulative organisms (DPAOs).

8. Method according to claim 1, wherein there is no addition of an external source of carbon and/or there is no addition of an external source of metal salts.

9. A method of biologically treating water containing carbon, nitrogen and phosphorus and removing carbon, nitrogen and phosphorus from the water, comprising:
   directing the water into an SBMBBR containing biofilm carriers;
   subjecting the water to sequences of successive treatments in the SBMBBR, each treatment sequence comprising:
      an initial phase of aerobic treatment;
      after the initial phase of aerobic treatment, subjecting the water in the SBMBBR to at least one aerobic/anoxic cycle comprising:
      an aerobic treatment phase that maintains an ammonium ion concentration in the water greater than a threshold concentration; and
      a phase in which the biofilm carriers are maintained, at least locally, under anoxic conditions with this phase occurring in the aerobic treatment phase or after the aerobic treatment phase; and
   wherein the threshold concentration of ammonium ions is set to allow development of anammox microorganisms during the phase in which the biofilm carriers are maintained, at least locally, under anoxic conditions.

10. The method of claim 9 wherein the method gives rise to DPAOs and wherein the method includes utilizing the DPAOs to accumulate polyphosphates in the water being treated.

11. The method of claim 10 wherein the method is performed without pre-seeding the water with anammox or DPAO microorganisms.

12. The method of claim 11 wherein the method is carried out without any addition of an external source of carbon or an external source of metal salts.

13. The method of claim 9 wherein the threshold of ammonium ion concentration is set at 1 mg N/L or higher.

14. The method of claim 9 wherein during the phase in which the biofilm carriers are maintained, at least locally, under anoxic conditions, the anammox microorganisms and DPAO microorganisms transforms $NH_4^+$ $NO_2^-$ and $NO_3^-$ into nitrogen without requiring an external source of carbon and at the same time the DPAOs also remove phosphorus from the water by accumulation.

15. The method of claim 9 wherein in each treatment sequence, the SBMBBR has a volume exchange ratio (ERV) between 90% and 100%.

16. The method of claim 9 wherein for each biological treatment cycle, the anaerobic treatment phase lasts from 30 minutes to 5 hours and at least one aerobic/anoxic cycle lasts from 1 hour to 10 hours.

17. The method of claim 9 wherein said biofilm carriers include a particular geometry that is configured to cause the biofilm carriers to remain in proximity to each other during aeration in the SBMBBR so as to form local anoxic conditions during the aerobic treatment phase.

* * * * *